(No Model.)
G. W. HARRINGTON.
DRAFT EQUALIZER.
No. 291,899. Patented Jan. 15, 1884.
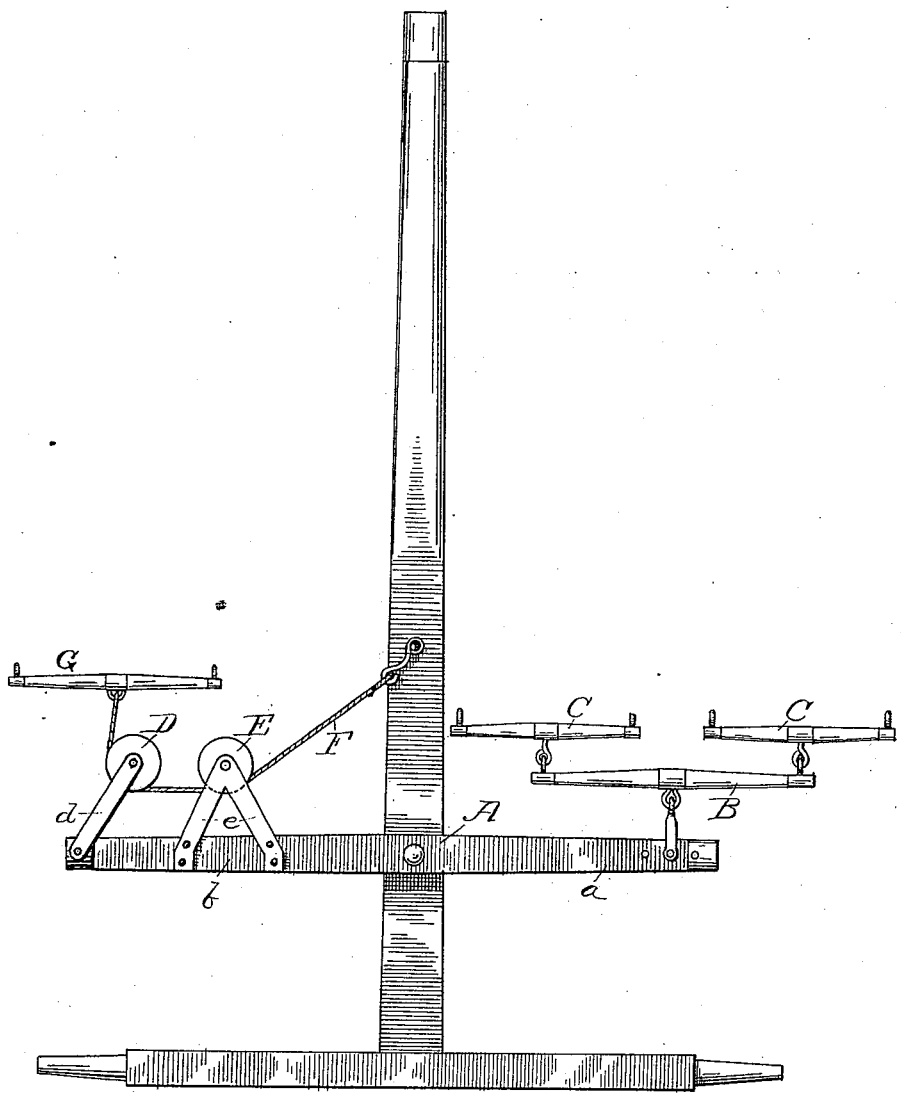
WITNESSES:
S. S. Schoff
E. W. Schirach
George W. Harrington
INVENTOR
BY James H. Coyne,
ATTORNEY

UNITED STATES PATENT OFFICE.

GEORGE W. HARRINGTON, OF PLAINVIEW, MINNESOTA.

DRAFT-EQUALIZER.

SPECIFICATION forming part of Letters Patent No. 291,899, dated January 15, 1884.

Application filed November 10, 1883. (No model.)

*To all whom it may concern:*

Be it known that I, GEORGE W. HARRINGTON, of Plainview, in the county of Wabasha and State of Minnesota, have invented certain new and useful Improvements in Draft-Equalizers; and I do hereby declare that the following is a full, clear, and exact description of the invention, which will enable others skilled in the art to which it appertains to make and use the same, reference being had to the accompanying drawing, and to letters of reference marked thereon, which form a part of this specification.

The object of my invention is to provide a new and efficient draft-equalizer, whereby the draft of three horses is best distributed and utilized. This I accomplish by the use of a triple-tree pivoted near its center of length to the pole, and by applying the draft of one horse to one arm in such a manner that it equalizes the draft of two horses applied to the other arm of the same.

The figure is a plan view of my improved draft-equalizer.

Reference being had to the drawing, the triple-tree A is shown as being pivoted in a suitable manner to the pole or tongue of a vehicle. One of its arms, $a$, is preferably shorter than the other, $b$, and has connected to its outer extremity, by means of a suitable clevis, a double-tree, B, to the ends of which are connected the single-trees C C, the whole being designed to utilize the draft of two horses.

To the extremity of the longer arm $b$ of the triple-tree (which is preferably about one and one-third time the length of the shorter arm thereof) is pivoted a link, $d$, having bearings in its extremities for the concave pulley D; and permanently fixed to said arm $b$, between the pivotal point of the link $d$ and the fulcrum of said triple-tree, is the V-frame $e$, the extremity of the arms of said V-frame being attached to said arm $b$, and having suitable bearings for the concave pulley E at the vertex or point of connection. Said pulleys D and E correspond in dimensions, and are about the same distance removed from the arm $b$, to which they are connected.

Secured in a suitable manner on the tongue or pole of the vehicle to which my equalizer is attached, and at about twice the distance from the triple-tree that the pulleys are, is a draft-rope or chain, F. This rope pursues an oblique course from the point of its connection to the pole to pulley E around the same and pulley D forward in the line of draft, where it terminates a short distance from pulley D, and is connected to the single-tree G, to which one horse is attached, and enabled to equalize the draft of the two horses applied to the shorter arm of the triple-tree, in the manner hereinbefore explained. When the draft of the two horses is greater than that of the one horse, the long arm of the double-tree will oscillate backward. At the same time, just in proportion as the said longer arm is oscillated backward, the draft-rope will assume a more direct line between its point of connection to the pole and the pulley D, thus throwing the draft of the one horse more direct on the end of the said arm $b$. But when the triple-tree is at right angles to the line of draft, a certain proportion of the draft of one horse will be utilized at a point on said arm $b$ intersected by a right line drawn from the pivotal center of the pulley E. Another advantage in the use of my equalizer is that the horse pulling on arm $b$ may be nearer in toward the pole, and this feature renders my invention especially valuable when applied to a harvester, as the facilities for placing the one horse nearer the pole without destroying or detracting from the efficacy of his draft will prevent the trampling down the grain before the harvester-knives.

What I claim as new, and desire to protect by Letters Patent, is—

1. The means for equalizing at one arm, $b$, double the amount of draft applied to the arm $a$ of triple-tree A, consisting of the pulley D, oscillatingly connected to the extremity of said arm $b$, a pulley, E, connected to the same between the end and fulcrum, and a draft rope or chain, F, secured at one end to the pole of the vehicle or machine and passing thence around said pulley, substantially as set forth.

2. In a draft-equalizer for three horses, the pulleys D and E, fixed to the longer arm of the triple-tree, said pulley D being oscillatingly connected thereto, and a draft rope or chain, F, fastened at one end to the tongue of the vehicle or machine, and after passing around said pulleys, as shown, having attached to its other end a single-tree, G, in combination with the double-tree B, connected to the shorter arm of said triple-tree, substantially as and for the purpose set forth.

In testimony that I claim the foregoing as my own I hereunto affix my signature in presence of two witnesses.

GEORGE W. HARRINGTON.

Witnesses:
 JOHN F. POPE,
 FRANK D. THOMASON.